June 17, 1930.  W. A. BOLLINGER  1,765,048
HEATING APPARATUS
Filed June 22, 1928
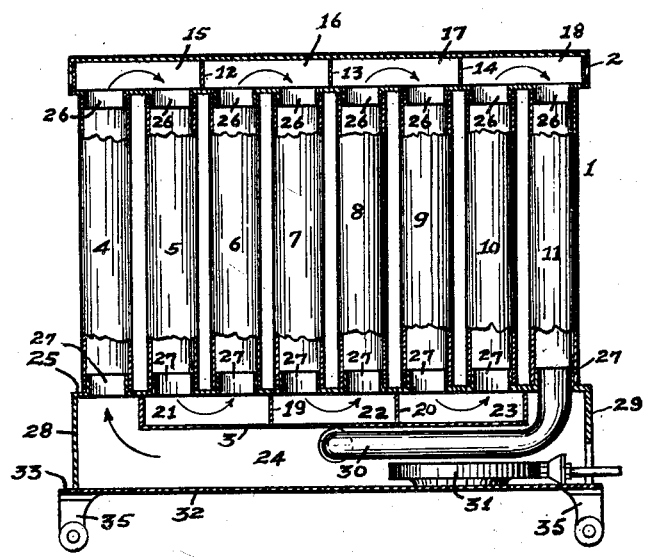
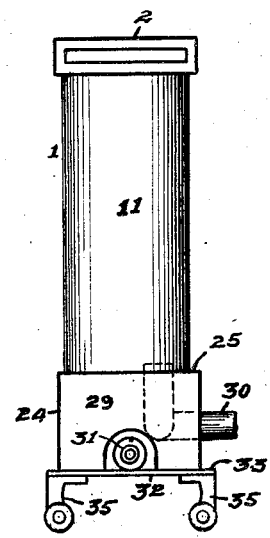
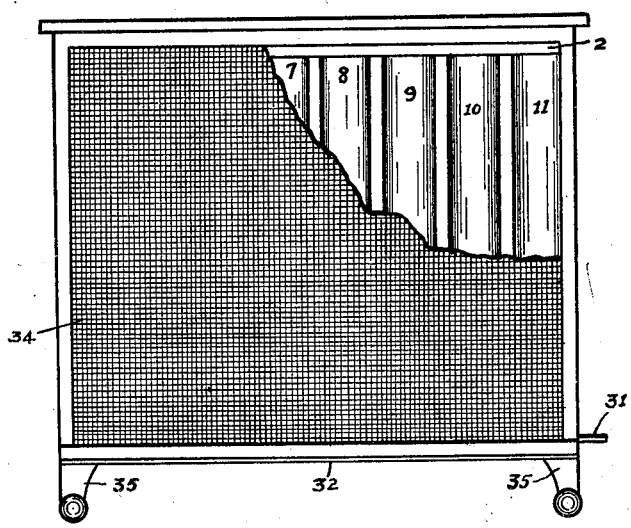
INVENTOR
William A. Bollinger
By Jack Snyder
attorney Patented June 17, 1930

1,765,048

UNITED STATES PATENT OFFICE

WILLIAM A. BOLLINGER, OF PITTSBURGH, PENNSYLVANIA, ASSIGNOR OF ONE-FOURTH TO WILLIAM AUGUSTUS BOLLINGER AND ONE-FOURTH TO ELMER N. BOLLINGER, BOTH OF PITTSBURGH, PENNSYLVANIA

HEATING APPARATUS

Application filed June 22, 1928. Serial No. 287,616.

My invention relates to improvements in a heating apparatus of the class disclosed in my United States Patent numbered 1,658,367, and in my co-pending application for Letters Patent of the United States bearing filing date the 29th day of November, 1926, and Serial No. 151,333, and while primarily intended for heating apparatus of the hot air type, it is to be understood that the invention may be embodied in any other type of heating apparatus wherein it is found to be applicable.

Important objects of the invention are to provide a heating apparatus of the character described, which will greatly increase the heat supply on the same fuel consumption by utilizing and consuming the products of combustion while passing from the combustion chamber to the flue or chimney; which may be readily connected to heating units already installed as well as form a component part of a new heating system; which is efficient and economical in its use and operation; compact and attractive in appearance and comparatively inexpensive to manufacture, install and operate.

To the accomplishment of these and such other objects as may hereinafter appear, the invention consists of the novel construction, combination and arrangement of parts herein specifically described, and illustrated in the accompanying drawing wherein is shown an embodiment of the invention, but it is to be understood that changes, variations and modifications may be resorted to which come within the scope of the claim hereunto appended.

In the drawing wherein like numerals of reference designate corresponding parts throughout the several views:—

Figure 1 is a side elevational view of a heating apparatus, partly in section, embodying the invention.

Figure 2 is an end view thereof.

Figure 3 is a side elevational view of the apparatus suitably enclosed in a radiator cover.

Referring in detail to the drawing 1 denotes a hot air radiator manifold comprising a closed upper casing 2, a closed lower casing 3, and a plurality of conductor pipes respectively indicated at 4, 5, 6, 7, 8, 9, 10 and 11. The casings 2 and 3 are preferably rectangular in contour, and the conductor pipes 4, 5, 6, 7, 8, 9, 10 and 11 are preferably oblong in transverse cross section to afford greater radiating surface.

The upper casing 2 is provided with three transversely disposed partitions 12, 13 and 14. The latter divide the upper casing 2 into four separate compartments 15, 16, 17 and 18. The lower casing 3 is likewise provided with two transversely disposed partitions 19 and 20 which divide the former into three separate compartments 21, 22 and 23.

The combustion chamber 24 is disposed below the radiator manifold, and the top 25, of the former constitutes the top of the lower casing 3. The bottom of the upper casing 2 is formed with a plurality of downwardly flanged oblong openings 26, two of which communicates with each of the upper casing compartments 15, 16, 17 and 18. The combustion chamber top 25 is formed with a plurality of upwardly flanged oblong openings 27, two of which communicates with each of the lower casing compartments 21, 22, and 23.

The flanged openings 26, in the upper casing 2, correspond to and are disposed parallel with respective flanged openings 27 in the combustion chamber top 25. The two flanged openings 27 in the combustion chamber top 25, which are disposed at respective ends of the latter, communicate directly with the combustion chamber 24 in the clearances provided between the ends of the lower casing 3 and respective end walls 28 and 29 of the combustion chamber 24.

The conductor pipes 4, 5, 6, 7, 8, 9, 10 and 11 are attached to the flanged oblong openings 26 and 27 and are arranged as follows:—The inlet conductor pipe 4 communicates with the combustion chamber 24 at its lower end, and with the upper casing compartment 15 at its upper end. The conductor pipe 5 communicates with the upper casing compartment 15 at its upper end, and with the lower casing compartment 21 at its lower end; the conductor pipe 6 communicates with the lower casing compartment 21 at its lower end, and with the upper casing compartment 16 at its upper end. The conductor pipe 7 communicates with the upper casing compartment 16 at its upper end, and with the lower casing compartment 22 at its lower end. The conductor pipe 8 communicates with the lower casing compartment 22 at its lower end, and with the upper casing compartment 17 at its upper end; the conductor pipe 9 communicates with the upper casing compartment 17 at its upper end, and with the lower casing compartment 23 at its lower end. The conductor pipe 10 communicates with the lower casing compartment 23 at its lower end, and with the upper casing compartment 18 at its upper end, and the conductor pipe 11 communicates with the upper casing compartment 18 at its upper end, and with the flue pipe 30 at its lower end.

It will be obvious that the upper casing compartments 15, 16, 17 and 18, and the lower casing compartments 21, 22, and 23, merely constitute inter-communicating passageways for suitably connecting the associated conductor pipes to provide a continuous passage from the combustion chamber 24 to the flue pipe 30. The burner element 31 is positioned in the combustion chamber 24 preferably adjacent to the combustion chamber end wall 29.

The flue pipe 30 is disposed in the combustion chamber 24 preferably above and at one side of the burner element 31 in proximity to the latter. The flue pipe 30 extends through the rear wall of the combustion chamber 24 and communicates with draft stack or chimney.

In the operation of the heating apparatus, the products of combustion pass, as indicated by arrows, from the burner element 31 through the combustion chamber 24, upwardly through the inlet conductor pipe 4, through the upper casing compartment 15, downwardly through the conductor pipe 5, through the lower casing compartment 21, upwardly through the conductor pipe 6, through the upper casing compartment 16, downwardly through the conductor pipe 7, through the lower casing compartment 22, upwardly through the conductor pipe 8, through the upper casing compartment 17, downwardly through the conductor pipe 9, through the lower casing compartment 23, upwardly through the conductor pipe 10, through the upper casing compartment 18, downwardly through the conductor pipe 11, and through the flue pipe 30, where it is dissipated in the stack or chimney.

The bottom 32, of the combustion chamber 24, is provided with extending edge margins 33, for supporting a cover 34, which may be constructed from any suitable foraminous material that will not retard the passage of the heat emanating from the radiator manifold 1. Feet 35 are attached to the combustion chamber bottom 32 for properly elevating the heating device from the floor, and in conjunction with the cover 34, provide an attractive appearance for the heating structure and render the same adaptable for living room installations.

It will here be noted that the arrangement, configuration, and number of the conductor pipes embodied in my improved heating apparatus may be widely varied to best meet any conditions found in practice. Further, the construction of the combustion chamber may be such as to render the latter adaptable for the consumption of coal, gas or any other fuel.

The feature of the present invention is in positioning the flue pipe 30 in the combustion chamber 24 so that the flue pipe 30 will be maintained at a very high temperature from the heat of the burner element 31. This arrangement of the flue pipe 30 will not only promote proper draft action through the radiator manifold 1 but will further serve to entirely consume all material products of combustion. Under such conditions my improved heating apparatus will function at maximum efficiency indefinitely with a minimum of attention.

What I claim is:

In combination, a heating apparatus comprising a horizontally disposed upper casing divided into a plurality of separate compartments; a horizontally disposed lower casing divided into a plurality of separate compartments; a plurality of vertically disposed conductor pipes; the upper ends, of two adjacent conductor pipes communicating with each of the said upper casing compartments; a combustion chamber disposed below said lower casing; the bottom of said lower casing constituting the top of said combustion chamber; the lower ends of the two conductor pipes, which are disposed on respective ends of said lower casing, communicating with said combustion chamber; the lower ends, of two adjacent of the others of said conductor pipes, communicating with each of respective lower casing compartments; a flue member mounted in said combustion chamber and communicating with the lower end of one of said end conductor pipes; and a heating element mounted in one end of said combustion chamber below and in close proximity to said flue member, substantially as described and for the purpose set forth.

In testimony whereof I affix my signature.

WILLIAM A. BOLLINGER.